United States Patent
Jiang et al.

(10) Patent No.: US 12,354,346 B1
(45) Date of Patent: Jul. 8, 2025

(54) SYSTEM AND METHOD FOR ANOMALY DETECTION FROM HYPERSPECTRAL DATA

(71) Applicant: HRL Laboratories, LLC, Malibu, CA (US)

(72) Inventors: Qin Jiang, Oak Park, CA (US); Yuri Owechko, Newbury Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 399 days.

(21) Appl. No.: 17/744,239

(22) Filed: May 13, 2022

Related U.S. Application Data

(60) Provisional application No. 63/222,362, filed on Jul. 15, 2021.

(51) Int. Cl.
    *G06V 20/10* (2022.01)
    *G06T 7/00* (2017.01)

(52) U.S. Cl.
    CPC .......... *G06V 20/194* (2022.01); *G06T 7/0002* (2013.01); *G06T 2207/10036* (2013.01)

(58) Field of Classification Search
    CPC ................. G06V 20/194; G06V 20/54; G06T 2207/10036; G06T 7/0002
    See application file for complete search history.

(56) References Cited

U.S. PATENT DOCUMENTS

| | | | | |
|---|---|---|---|---|
| 8,884,989 | B2* | 11/2014 | Chaudhuri | G06T 5/50 345/634 |
| 2008/0266430 | A1* | 10/2008 | Friedhoff | H04N 23/11 348/268 |
| 2009/0074297 | A1* | 3/2009 | Robinson | G06V 10/7715 382/191 |
| 2011/0147588 | A1* | 6/2011 | Chaudhuri | G06T 5/50 250/334 |

(Continued)

OTHER PUBLICATIONS

Rashwan et al."A Split-and-Merge Approach for Hyperspectral Band Selection" IEEE Geoscience and Remote Sensing Letters (vol. 14, Issue: 8, Aug. 2017 (Year: 2017).*

(Continued)

*Primary Examiner* — Sean T Motsinger
(74) *Attorney, Agent, or Firm* — TOPE-MCKAY & ASSOCIATES

(57) ABSTRACT

Described is a system for anomaly detection from hyperspectral data. The system receives, from a hyperspectral sensor, input hyperspectral data cubes with input data bands for every pixel. Using an optimization technique, an optimized number of virtual bands is determined to use for combining the hyperspectral data cubes to achieve optimal anomaly detection performance. The optimized number of virtual bands is less than the input data bands, resulting in reduced hyperspectral data. The hyperspectral data cubes are combined into the optimized number of virtual bands with the optimal bandwidth for each virtual band, and a set of combined hyperspectral data is output. Anomalies are (Continued)

detected in the set of combined hyperspectral data using an anomaly detection technique. Based on the detected anomalies, single-pixel or subpixel targets of interest are detected in the combined hyperspectral data.

12 Claims, 12 Drawing Sheets

(56) References Cited

U.S. PATENT DOCUMENTS

| | | | | |
|---|---|---|---|---|
| 2013/0148195 A1* | 6/2013 | Achal | ................... | G01J 3/0208 |
| | | | | 359/728 |
| 2014/0314272 A1* | 10/2014 | Sebastian | ................ | G06T 7/254 |
| | | | | 382/103 |

OTHER PUBLICATIONS

I.S. Reed, and X. Yu, "Adaptive multiple-band cfar detection of an optical pattern with unknown spectral distribution," IEEE Trans. Acoust. Speech Signal Process. 38 (1990), pp. 1760-1770.

Mark J. Carlotto, "A cluster-based approach for detecting man-made objects and changes in imagery," IEEE Trans. Geosci. Remote Sens. 43 (2) (2005), pp. 374-387.

Kennedy, J. and Eberhart, R., "Particle Swarm Optimization". Proceedings of IEEE International Conference on Neural Networks. IV., 1995, pp. 1942-1948.

* cited by examiner

SYSTEM AND METHOD FOR ANOMALY DETECTION FROM HYPERSPECTRAL DATA

STATEMENT REGARDING FEDERALLY SPONSORED RESEARCH OR DEVELOPMENT

This invention was made with government support under U.S. Government Contract Number FA8650-20-C-7022. The government has certain rights in the invention.

CROSS-REFERENCE TO RELATED APPLICATIONS

This is a Non-Provisional Application of U.S. Provisional Application No. 63/222,362, filed in the United States on Jul. 15, 2021, entitled, "A Method of Using Particle Swarm Optimization to Find Optimal Virtual Bands for Anomaly Detection in Hyperspectral Data," the entirety of which is incorporated herein by reference.

BACKGROUND OF INVENTION

(1) Field of Invention

The present invention relates to a system for anomaly detection from hyperspectral data and, more specifically, to a system for anomaly detection from hyperspectral data using particle swarm optimization.

(2) Description of Related Art

Anomaly detection is an important task in hyperspectral data analysis. The anomalies are pixels with spectra that differ from the background scene. Hyperspectral sensors use a large range of wavelengths to sense the environment. As a result, hyperspectral data are generally huge three-dimensional (3D) data cubes, consisting of hundreds of bands/channels for every pixel. Processing hyperspectral data is computationally intensive because of the huge amount of 3D data. In addition, hyperspectral data generally cover a large geographical area from a few square kilometers to hundreds of square kilometers. Detecting small objects (i.e., anomalous points) in a large area is a difficult task.

Therefore, there are two main challenges in anomaly detection from hyperspectral data: one is to process huge amounts of high-dimension data and the other is to detect small targets (single-pixel or subpixel targets) from a large area. To overcome the high dimension problem, many hyperspectral data processing techniques use dimension reduction techniques, such as principle component analysis (PCA), locally linear embedding (LLE), and isometric feature mapping (ISOMAP) to reduce the amount of data for processing. However, most existing dimension reduction techniques are not suitable for single-pixel and subpixel anomaly detection since after the dimension reduction, single-pixel and subpixel anomaly points may not be detectable.

Thus, a continuing need exists for a method which addresses the aforementioned challenges of processing large amounts of high-dimension data and is able to detect small objects from a large area. Described herein is an approach which reduces the amount of data in hyperspectral data cubes by combining bands in the wavelength domain and uses an optimization technique to find the best bandwidths for the combined wavelength bands to maximize the performance of single-pixel/subpixel anomaly detection.

SUMMARY OF INVENTION

The present invention relates to a system for anomaly detection from hyperspectral data and, more specifically, to a system for anomaly detection from hyperspectral data using particle swarm optimization to find optimal virtual bandwidths. The system comprises one or more processors and a memory having instructions such that when the instructions are executed, the one or more processors perform multiple operations. The system receives, from a hyperspectral sensor, a plurality of input three-dimensional (3D) hyperspectral data cubes comprising a plurality of wavelength bands for every pixel. Using an optimization technique, an optimized number of virtual bands is determined to use for combining the plurality of 3D hyperspectral data cubes to achieve optimal anomaly detection performance. The optimized number of virtual bands is less than the plurality of wavelength bands, resulting in reduced hyperspectral data. The plurality of 3D hyperspectral data cubes are combined into the optimized number of virtual bands in the wavelength domain, and a set of combined hyperspectral data is output. Anomalies are detected in the set of combined hyperspectral data using an anomaly detection technique. Based on the detected anomalies, single-pixel or subpixel targets of interest are detected in the combined hyperspectral data.

In another aspect, the single-pixel or sub-pixel targets correspond to a vehicle, and the system is configured to track the vehicle.

In another aspect, in determining the optimized number of virtual bands, the system, for a set of virtual bands, initially selects bandwidths of the set of virtual bands at random. Encoded values of the selected bandwidths are computed, resulting in encoded virtual bandwidths. A rectangular filter bank is generated using the encoded virtual bandwidths. The plurality of input 3D hyperspectral data cubes are transformed into virtual band data cubes using the rectangular filter bank.

In another aspect, the system optimizes bandwidths for each virtual band in the set of virtual bands using the optimization technique, thereby generating a plurality of optimal virtual bandwidths. A set of optimal rectangular filters is constructed using the plurality of optimal virtual bandwidths. The plurality of input 3D hyperspectral data cubes is filtered by the set of optimal rectangular filters. A set of filtered input data is generated, and anomaly points are detected in the set of filtered input data using the anomaly detection technique.

In another aspect, the optimization technique is particle swarm optimization (PSO), and the encoded virtual bandwidths correspond to positions of particles, wherein a false detection probability for a given positive detection probability is used as a fitness cost function to be minimized by PSO.

In another aspect, the positions of the particles are randomly initialized. Using initial positions of the particles, a fitness cost for each particle is computed using the anomaly detection technique. For each iteration, the system computes a velocity for each particle; updates each particle's position based on the computed velocity; uses the updated particle positions to compute a new fitness cost for each particle using the anomaly detection technique; uses the new fitness cost to update a local best position for each particle, updates a global best position for each particle; and updates an inertial weight. Following a pre-defined number of iterations, the global best positions converge to a global optimal position, the global optimal position corresponding to the plurality of optimal virtual bandwidths.

In another aspect, a hyperspectral sensor is designed with the optimized number of virtual bands.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
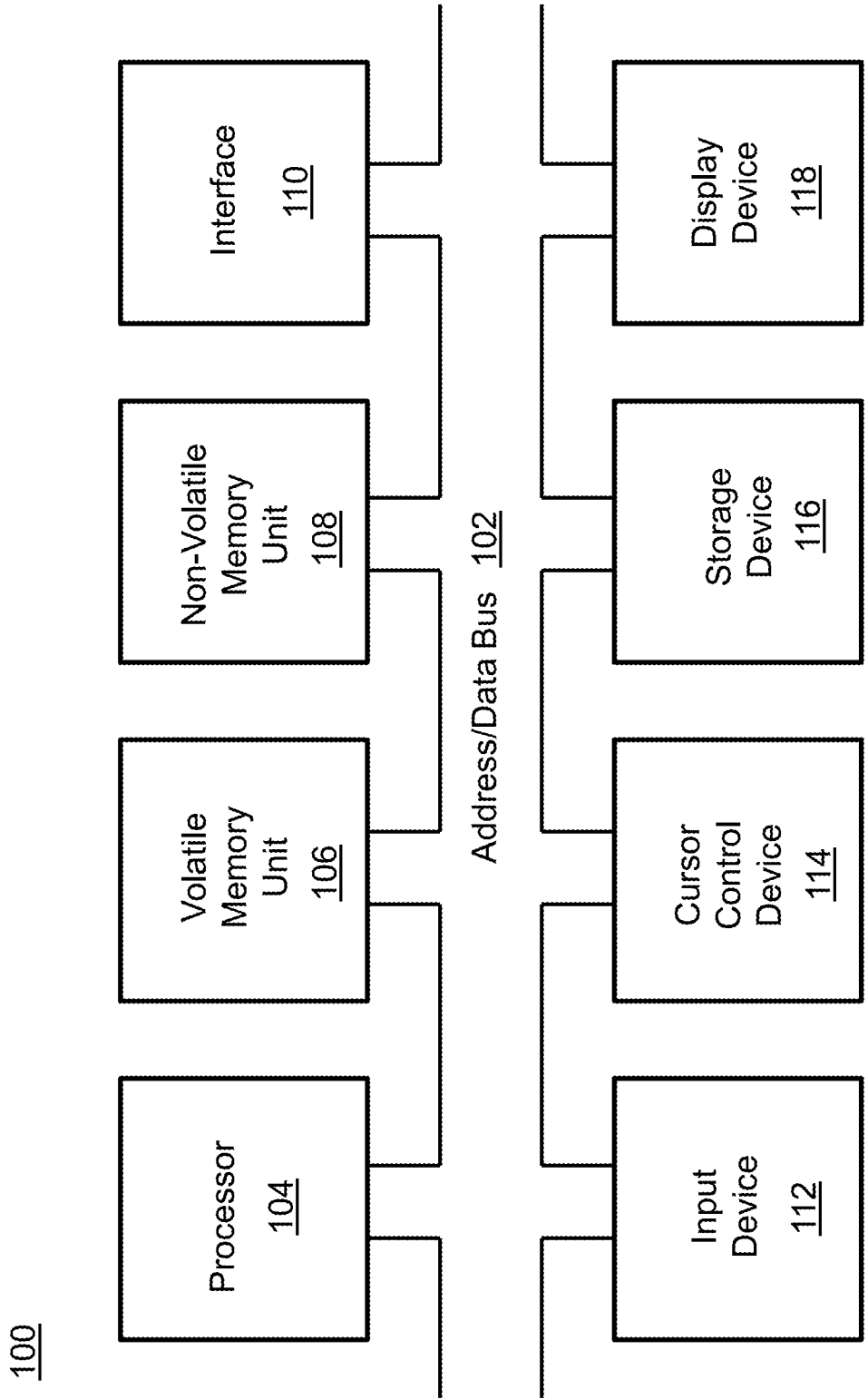
FIG. 1 is a block diagram depicting the components of a system for anomaly detection from hyperspectral data according to some embodiments of the present disclosure.

The present invention relates to a system for anomaly detection from hyperspectral data and, more specifically, to a system for anomaly detection from hyperspectral data using particle swarm optimization to find optimal virtual bandwidths. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. I. S. Reed, and X. Yu, "Adaptive multiple-band cfar detection of an optical pattern with unknown spectral distribution," IEEE Trans. Acoust. Speech Signal Process. 38 (1990) 1760-1770.
2. M. J. Carlotto, "A cluster-based approach for detecting man-made objects and changes in imagery," IEEE Trans. Geosci. Remote Sens. 43 (2) (2005) 374-387.

3. Kennedy, J. and Eberhart, R., "Particle Swarm Optimization". Proceedings of IEEE International Conference on Neural Networks. IV. (1995) 1942-1948.

(2) Principal Aspects

Various embodiments of the invention include three "principal" aspects. The first is a system for anomaly detection from hyperspectral data. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
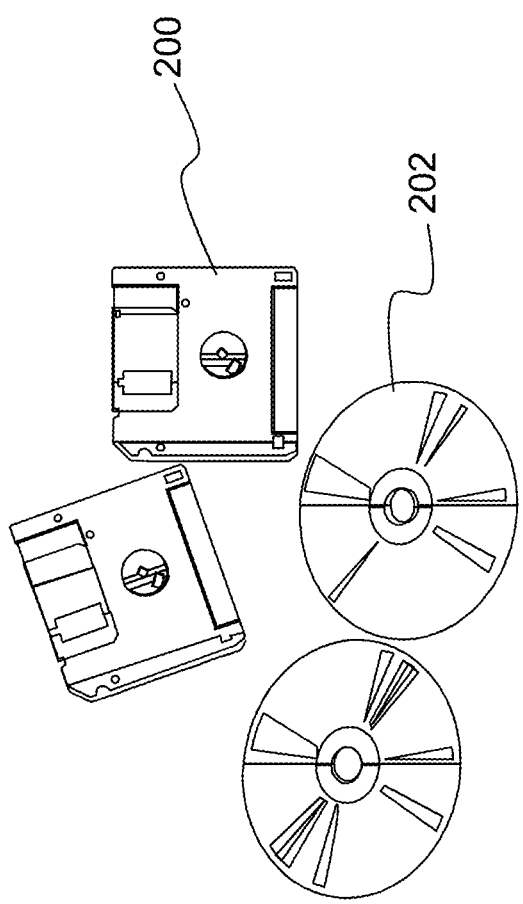
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention

Hyperspectral data are widely used in many applications such as surveillance, geographic surveys, chemical imaging, environment monitoring, and crop analysis. Hyperspectral sensors use a range of continuous wavelengths to sense objects/environment; as a result, hyperspectral data contains very rich spectral information of the objects/environment, which is important for many applications. For example, one can use hyperspectral data to identify objects with different materials since different materials have different spectral signatures. The major difficulty of using hyperspectral data is the data dimension since hyperspectral data are huge three-dimensional (3D) data cubes, which may require more computing power and memory to process than is readily available.

One important task in hyperspectral data analysis is anomaly detection from hyperspectral data since many applications, such as object classification, identification and tracking, depend on anomaly detection as the first processing step. Hyperspectral data generally cover a large geographical area from a few square kilometers to hundreds of square kilometers. Detecting small objects (i.e., anomalous points) in a large area is a difficult task. Therefore, there are two main challenges in anomaly detection from hyperspectral data: one is to process huge amounts of high-dimension data; and the other one is to detect small targets (single-pixel or subpixel targets) from a large area. To overcome the high dimension problem, many hyperspectral data processing techniques use dimension reduction techniques, such as principle component analysis (PCA), locally linear embedding (LLE), and isometric feature mapping (ISOMAP) to reduce the amount of data for processing. However, most existing dimension reduction techniques are not suitable for single-pixel and subpixel anomaly detection since after the dimension reduction, single-pixel and subpixel anomaly points may not be detectable. In the approach according to embodiments of the present disclosure, a virtual band method that reduces the amount of data in hyperspectral data cubes by combining bands in the wavelength domain is utilized. Further, an optimization technique to find the best bandwidths for the combined wavelength bands (virtual bands), which is able to maximize the performance of single-pixel/subpixel anomaly detection, is used.

Figure 3:
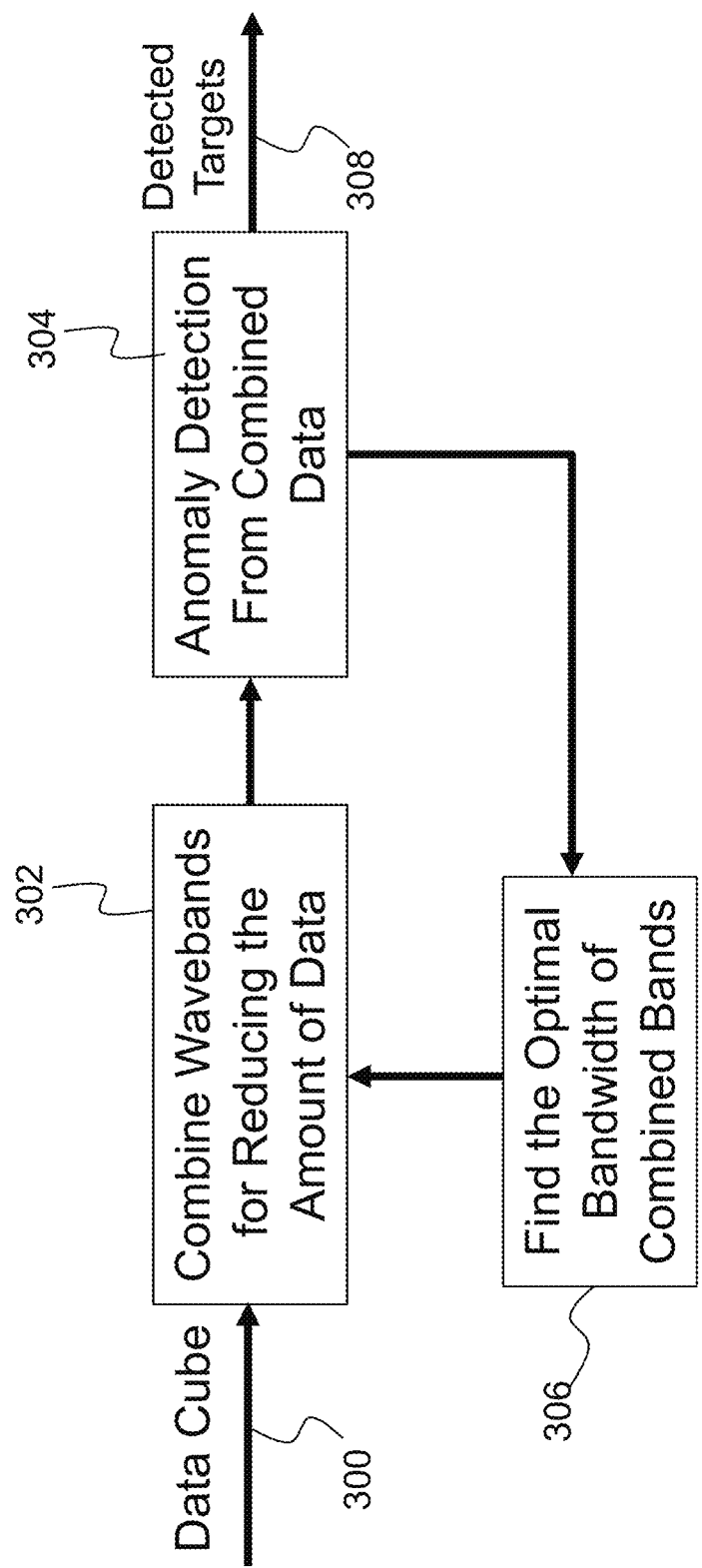
FIG. 3 is a flow diagram illustrating virtual band based anomaly detection from hyperspectral data cubes according to some embodiments of the present disclosure.

Described herein is a virtual band approach to combine hyperspectral data bands/channels into a small number of virtual bands, which are able to improve anomaly and target detection and reduce the computation. Unique aspects of the invention include (1) a virtual band approach to combine the data bands into a small number of virtual bands for reducing computation; and (2) using particle swarm optimization based (PSO), or other optimization techniques such as genetic algorithms, to determine the optimal number and bandwidths of the virtual bands, which are able to maximize the performance of anomaly detection from hyperspectral data. As described in detail below, experimental tests show that the present invention is effective to reduce the computation and improve the performance of anomaly detection from hyperspectral data FIG. 3 depicts the system diagram of virtual band-based anomaly detection in hyperspectral data cubes. Input data cubes 300, which generally contain a few hundred bands/channels, are combined in the wavelength domain into a small number of bands (i.e., combine data bands for reducing the amount of data 302). An optimization technique is used to determine the best way to combine the input data bands such that with the combined data, the system is able to achieve the best performance for anomaly detection (i.e., anomaly detection from combined data 304).

The method described herein has two advantages. The first is to reduce the amount of data for anomaly detection, and the second is to achieve the best performance for anomaly detection. Combining hyperspectral data cubes in the wavelength domain enables reduction of data redundancy and the level of noise, which can improve the signal to noise ratio (SNR) and provide the potential to achieve the best performance for anomaly detection. In addition, the method is able to provide useful information for guiding the hardware design of hyperspectral sensor systems since the method can determine the number of required bands and bandwidths (i.e., find the optimal bandwidth of combined bands 306) for achieving the best performance of anomaly detection for a given range of wavelengths and a given detection method for obtaining detected targets 308.

In one non-limiting example, the desired detection is a ship in the ocean from hyperspectral sensors on a satellite. Since the material of the ship is different from the water surrounding the ship, the reflected spectrum from the ship is different from the water. In a large oceanic region, the ship may be represented by a single pixel (anomaly point) in each spectral band. Using the invention described herein, the hyperspectral sensors are able to detect the ship and track it from the sky.

(3.1) Virtual Band Approach for Anomaly Detection

In general, hyperspectral data contain a few hundred bands/channels to cover a given range of wavelengths and each band/channel is a large two-dimensional (2D) image because hyperspectral sensors generally cover a huge area of interest. As a result, hyperspectral data are huge 3D data cubes, which makes detecting anomaly points from hyperspectral data a computationally challenging problem. As explained above, compressing each band (2D image) may make single-pixel/subpixel anomaly points undetectable. On the other hand, many hyperspectral data bands may share the similar/same spectral characteristics, and combining the similar bands may be able to reduce the data redundancy and the amount of data to process, and improve the SNR for anomaly detection. Based on this idea, a virtual band approach was proposed, in which the range of the wavelength is resampled into a small number of virtual bands that is much smaller than the original number of input data bands. The bandwidths of the virtual bands are determined by an optimization technique such that the virtual bands can enable the best performance of anomaly detection for a given detection technique.

Figures 4A, 4B:
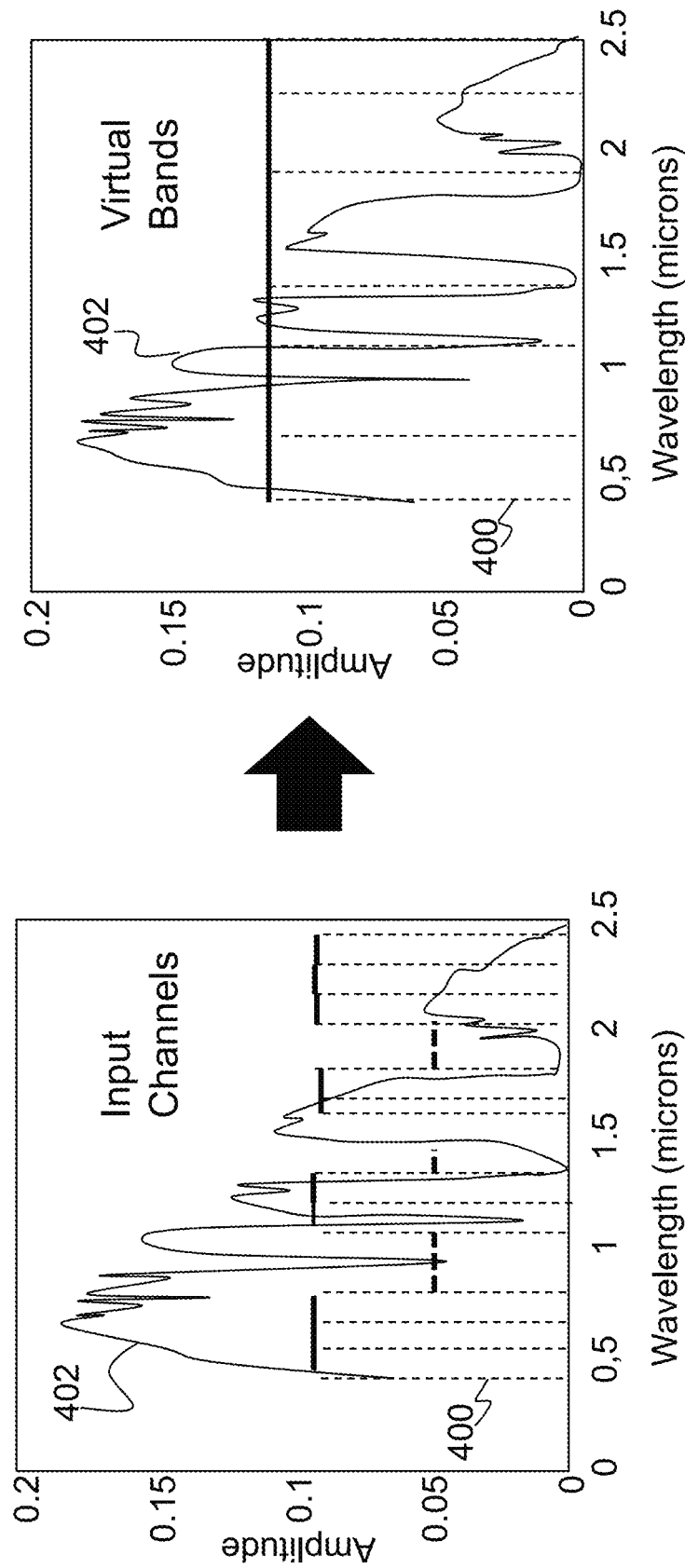
FIG. 4A is an illustration of uniform-bandwidth input data bands.
FIG. 4B is an illustration of six resampled virtual bands with different bandwidths according to some embodiments of the present disclosure.

FIGS. 4A and 4B present the concept of the virtual band method. The dashed lines 400 represent different bands over the wavelengths. The solid lines 402 represent mean spectra of input data cubes. FIG. 4A shows the mean spectral of the input data and the input bands (a few hundreds), which are uniformly sampled over the wavelength range of 0.4 to 2.5 microns. FIG. 4B depicts the spectral coverage of the virtual bands, which use a small number of bands to cover the same spectral range. This effectively reduces the amount of input data to process. Specifically, FIG. 4B shows the six virtual bands non-uniformly sampled over the wavelength range. The bandwidths of the virtual bands are determined by an optimization technique and a detection technique, as described in detail below.

Virtual bands uniformly distributed over the wavelength range are a trivial solution of the virtual band-based anomaly detection, which is computationally simple, but may not be optimal in terms of anomaly detection. In order to determine the best bandwidths of virtual bands, an optimization technique and an anomaly detection technique are needed for finding the optimal bandwidths. In principle, many anomaly detection techniques, such as Reed-Xiao (RX) algorithm (see Literature Reference No. 1) and the cluster-based anomaly detector (CBAD) (see Literature Reference No. 2), can be used in the virtual band based method. Many optimization techniques, such as genetic algorithm (GA) and simulated annealing (SA) technique, can be used as the optimization procedure for determining the optimal bandwidths.

In one embodiment, a blind acquisition of targets (BAT) algorithm and a particle swarm optimization (PSO) technique (see Literature Reference No. 3) were used in the virtual band method described herein. BAT has the best performance of anomaly detection compared to the existing techniques tested, and PSO is computationally simpler and more effective compared to other optimization techniques.

Figure 5:
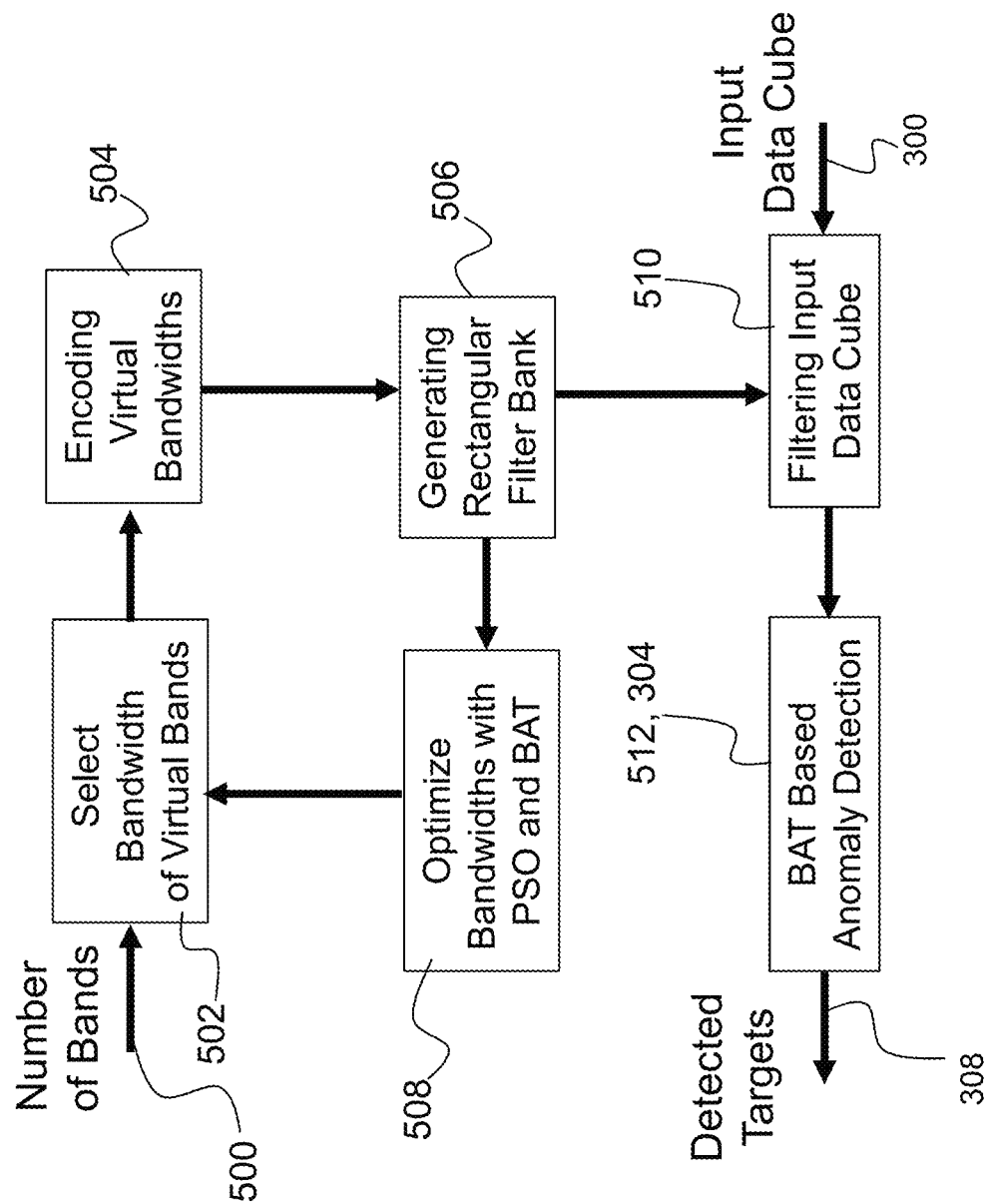
FIG. 5 is a flow diagram illustrating blind acquisition of targets (BAT) and particle swarm optimization (PSO) according to some embodiments of the present disclosure.

FIG. 5 shows the system diagram of the BAT and PSO based virtual band method for anomaly detection. In the approach according to embodiments of the present disclosure, for a given number of virtual bands 500, the bandwidths are randomly selected at first (select bandwidth of virtual bands 502). The values of selected bandwidths are encoded into the values within a normalized range of [0, 1] (encoding virtual bandwidths 504). Mathematically, if $L=\{l_1, l_2, \ldots, l_m\}$ is a set of m bandwidths, the encoded values of the bandwidths are computed according to the following:

$$b_i = \frac{l_i}{\sum_{k=1}^{m} l_k} \quad (1)$$

with $$\sum_{i=1}^{m} b_i = 1.$$

Since the virtual bandwidths are the resampled values of the wavelength range, the bandwidth range is represented by the range of [0, 1]. The encoded bandwidths are used to generate a rectangular filter bank with m filters (generating rectangular filter bank 506). If the input data has N (N>>m) bands, the wavelength range (band range) of each rectangular filter is calculated according to the following:

$$fb_i = \text{round}(N * b_i) \text{ with } \sum_{i=1}^{m} fb_i = N. \quad (2)$$

This means that for the ith virtual band filter, $fb_i$ input data bands are combined. With the filter lengths, the rectangular filters are defined by:

$$ft_i = \begin{cases} 1 & \text{if } fb_{i-1} \le i < fb_i \\ 0 & \text{otherwise} \end{cases} \quad (3)$$

with $fb_0=1$ and $1 \le i \le m$. The rectangular filter bank is used to transform the input data cubes into virtual band data cubes. Note that the virtual bands cover the entire wavelength range with no gaps or overlaps. Only the bandwidths of the individual virtual bands are optimized.

As depicted in FIG. 5, a BAT and PSO based optimization procedure is used to iteratively find the optimal virtual bandwidths (optimize bandwidths with PSO and BAT 508). The process of finding the optimal virtual bandwidths can be completed in an offline process; however, it also can be completed in an online process if the system has enough computing power. The optimal virtual bandwidths are used to construct a set of the optimal rectangular filters shown in Equation 3, and the input data cube is filtered by the optimal rectangular filters (filtering input data cube 510). Finally, the BAT algorithm (BAT based anomaly detection 512; anomaly detection from combined data 304 in FIG. 3) is applied to the filtered input data (filtering input data cube 510), which only has m bands, for detecting anomaly points. The details of the BAT and PSO based optimization procedure is presented in the next section.

(3.2) Finding the Optimal Virtual Bandwidths with BAT and PSO

To find the optimal virtual bandwidths, a PSO technique is used to iteratively compute the solution of the optimal virtual bandwidths. PSO is a well-known stochastic evolutionary optimization algorithm that is able to find the global optimal solution for a pre-defined fitness function. In the approach of the present invention, a BAT based detection function is used as the fitness function for PSO optimization. In other words, the PSO technique finds the optimal virtual bandwidths that are able to optimize the anomaly detection by the BAT algorithm.

Figure 6:
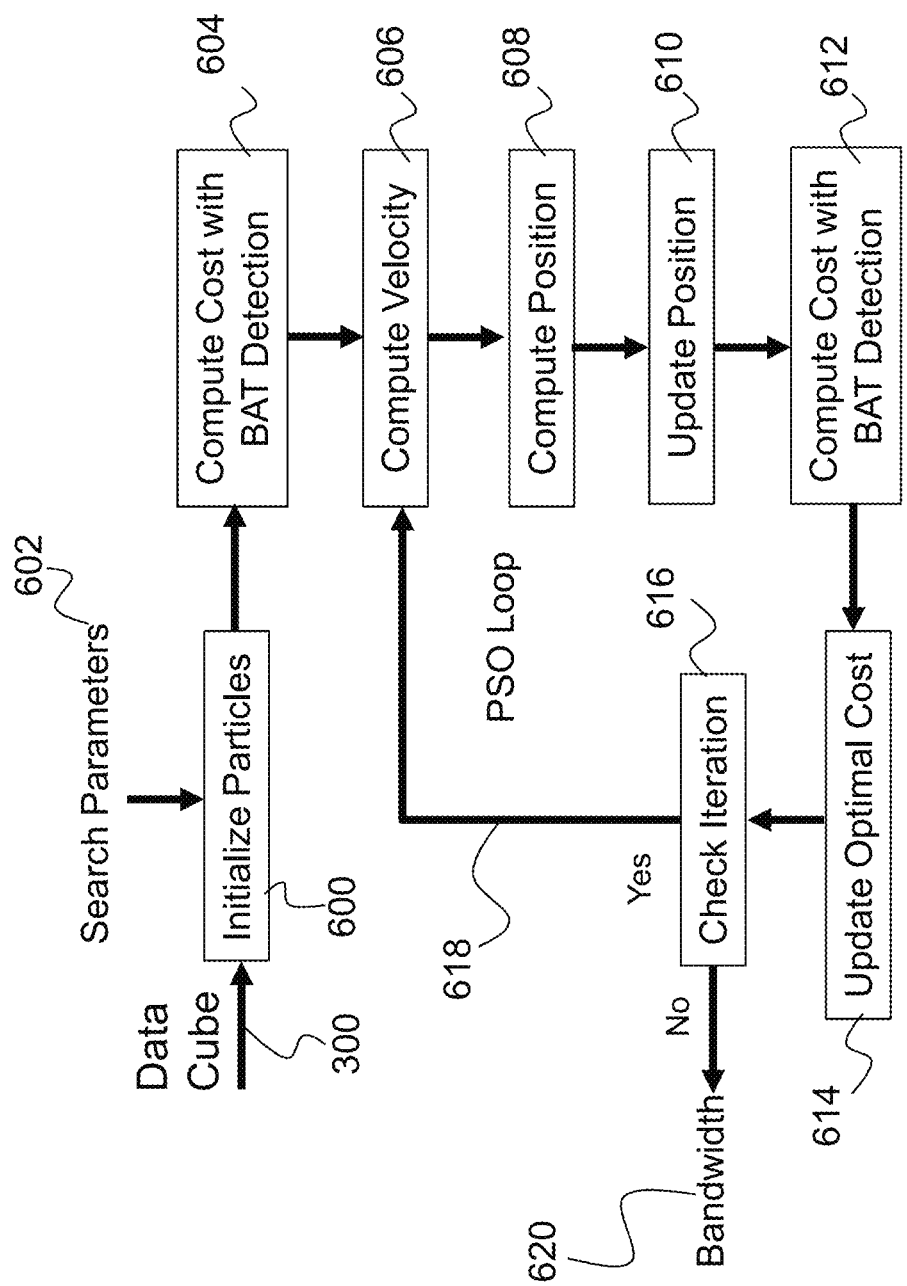
FIG. 6 is a flow diagram illustrating finding the optimal virtual bandwidths using PSO and BAT according to some embodiments of the present disclosure.

FIG. 6 depicts a flow diagram for finding the optimal virtual bandwidths with the PSO and BAT algorithms. In the PSO algorithm, for a given search space and a fitness function, finding the optimal solution of the fitness function is treated as a problem of finding the global best position in the solution space defined by the parameters being optimized. PSO finds the best solution using many moving particles with simple rules governing their motion. The quality of the positions is evaluated by the fitness function. The moving particles search for the best local positions within their local neighborhoods, and the local best positions are combined for finding the global best position. The new positions of moving particles are determined by directional velocities and the old positions of the particles. Therefore, in PSO search, there are only two variables to compute: one is the positions of the particles and the other is the velocity of the particles.

In the PSO search used in the present invention, the encoded virtual bandwidths are treated as the positions of particles. The false detection probability for a positive detection probability=0.9 is used as the fitness cost function which is minimized by PSO. The detection is performed by the BAT algorithm. Mathematically, the fitness cost function is defined as:

$$\text{fitness}(pos) = \text{Prob}(\text{falseprob}_{det} = 0.9), \quad (4)$$

where the variable pos=encoded virtual bandwidths. Referring to FIG. 6, to start the PSO search, first the positions of the particles are randomly initialized (initialize particles 600) based on a set of search parameters 602. The BAT algorithm is used to compute the fitness cost for every particle (compute cost with BAT detection 604). At the n+1 iteration, for particle position $p_i(n)$, the velocity is computed (compute velocity 606) according to the following:

$$V_i(n+1) = w*V_i(n) + c_1*\text{rand}*(pBest_i(n) - p_i(n)) + c_2*\text{rand}* \\ (gBest(n) - p_i(n)), \quad (5)$$

where the constant w is the inertial weight, the constant $c_1$ is the local learning weight, and the constant $c_2$ is the global learning weight. The variable rand is a random number uniformly distributed in (0, 1). The variable $pBest_i(n)$ is the local best position at the n iteration (e.g., the best position particle i has found so far) while the variable gBest (n) is the global best position at the n iteration (e.g., the best position the entire swarm of particles has found so far) (compute position 608). Using the calculated velocity, the particle position is updated (update position 610) by:

$$p_i(n+1) = p_i(n) + V_i(n+1). \quad (6)$$

The new position is checked with the boundary values (pmin, pmax) as follows:

$$p_i(n+1) = \min(p_i(n+1), p\max) \quad (7)$$

and $$p_i(n+1) = \max(p_i(n+1), p\min). \quad (8)$$

Using the updated particle positions, the BAT algorithm computes a new fitness cost for every particle (compute cost with BAT detection 612). The new fitness cost is used to update the local best position of particle i by:

$$pBest_i(n+1) = \begin{cases} newCost_i & \text{if } newCost_i < pBest_i(n) \\ pBest_i(n) & \text{otherwise} \end{cases} \quad (9)$$

After updating the local best positions, the global best position is updated by:

$$gBest(n+1) = \begin{cases} pBest_i(n+1) & \text{if } pBest_i(n+1) < gBest(n) \\ gBest(n) & \text{otherwise} \end{cases} \quad (10)$$

The inertial weight is updated in each iteration according to the following:

$$w = w * w_{damp}. \quad (11)$$

where the constant $w_{damp} = 0.99$ is the damping weight and it is to gradually reduce the impact from the past values. The updating of the local best position, the global best position, and the inertial weight results in updating the optimal cost 614. After a pre-defined number of iterations (check iterations 616 and PSO loop 618), the global best position generally converges to the global optimal position, which is the optimal virtual bandwidths 620 that is able to enable the best performance of BAT based anomaly detection.

The number of particles is generally dependent on the dimension and complexity of the search space; however, a widely used number is between 20 to 50 particles. The number of iterations is also dependent on the search space. In general, the higher the dimension of the search space, the more iterations are required to find the global optimal solution. The two weight factors, $c_1$ and $c_2$, play different roles. The weight $c_1$ is the personal learning coefficient representing the individual particle experience while the weight $c_2$ is the global learning coefficient representing the social experience. Since each particle is independent in finding the local best position, PSO search can be processed in parallel for improving search efficiency. To determine the best number of virtual bands, the system described herein can iterate over a range of virtual bands to find the best number of virtual bands that is able to produce the best anomaly detection result for a given hyperspectral data set. For the purposes of this disclosure, "bandwidth" refers to the length of a band. Generally, for virtual bands, each band has a different bandwidth. For the input data cube, the invention described herein finds the optimal number of virtual bands and the optimal bandwidths for the virtual bands in order to optimize anomaly detection.

(3.3) Experimental Studies

Figures 7A, 7B:
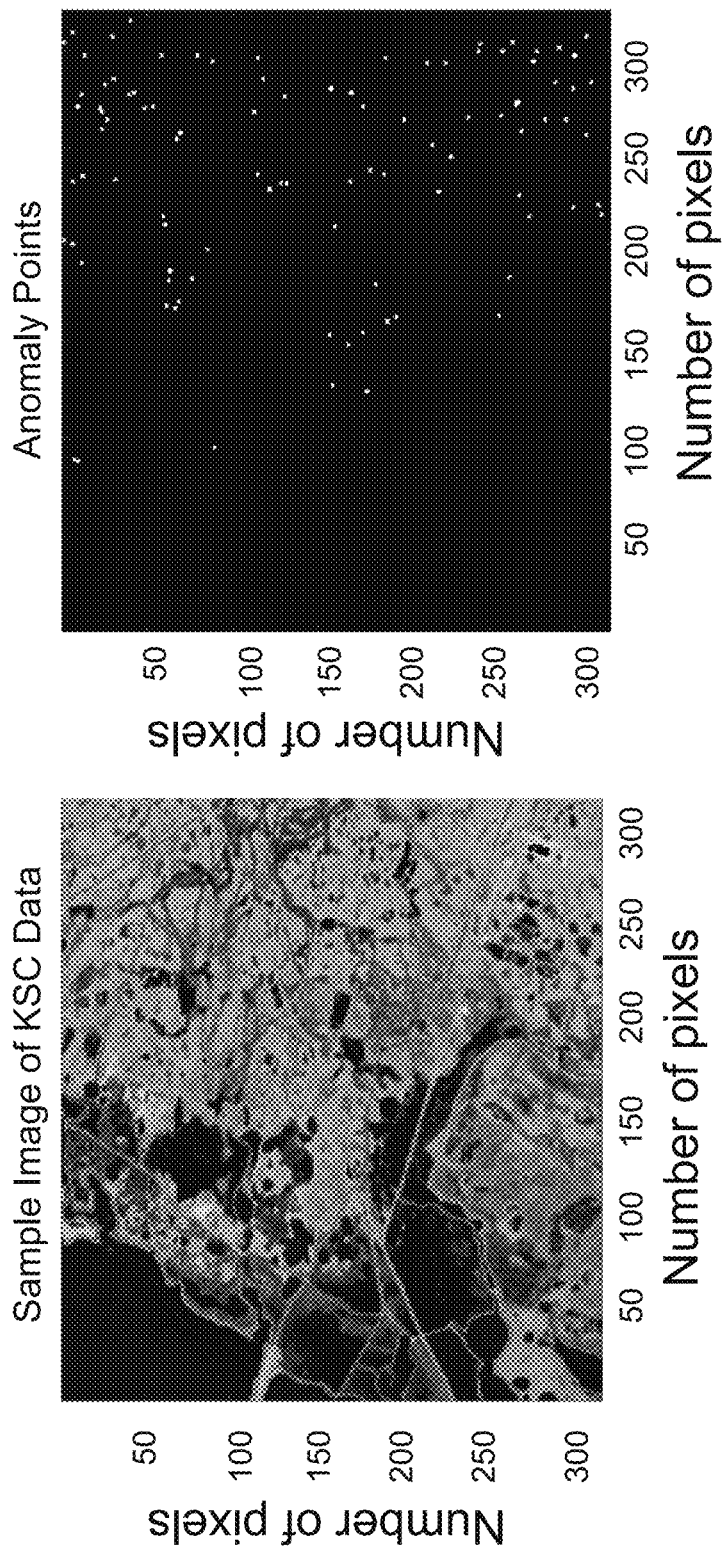
FIG. 7A is an illustration of a sample image of a Kennedy Space Center (KSC) data cube.
FIG. 7B is an illustration of anomaly points randomly distributed in the KSC data cube.

In experimental tests, two hyperspectral data sets were used to evaluate the virtual band-based anomaly detection process as described herein. The first data set is a hyperspectral data cube called Kennedy Space Center (KSC data cube), which is publicly available. The data cube contains 176 bands/channels, and each band is an image with a size of 320×320. FIGS. 7A and 7B illustrate a sample image of the KSC data cube and 100 anomaly points, which are ground truth points used to evaluate the performance of the present invention. FIG. 7A shows the 2D image from band 85, and FIG. 7B shows the anomaly points randomly distributed in the data. Each anomaly point is a single pixel. In order to show the points, the anomaly points are enlarged in FIG. 7B.

Figure 8A:
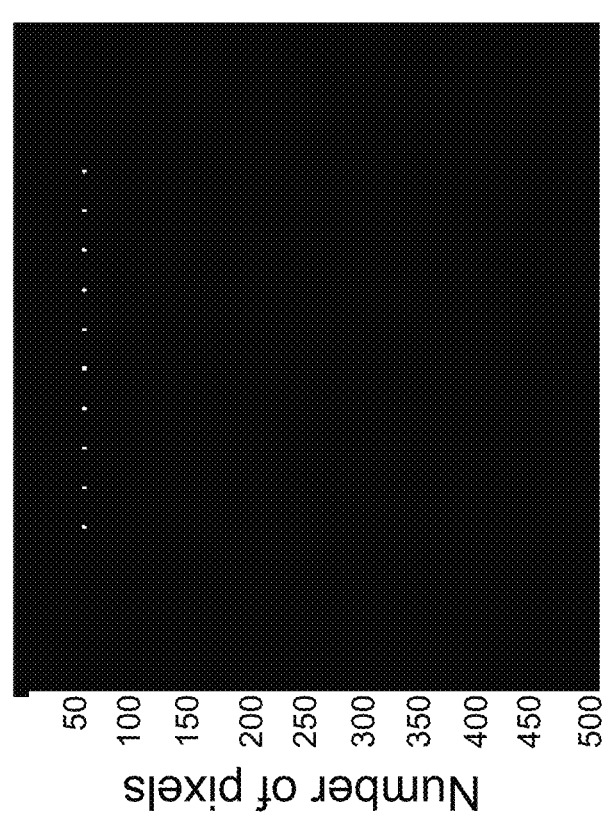
FIG. 8A is an illustration of a sample image of a NVIR1m data cube.
Figure 8B:
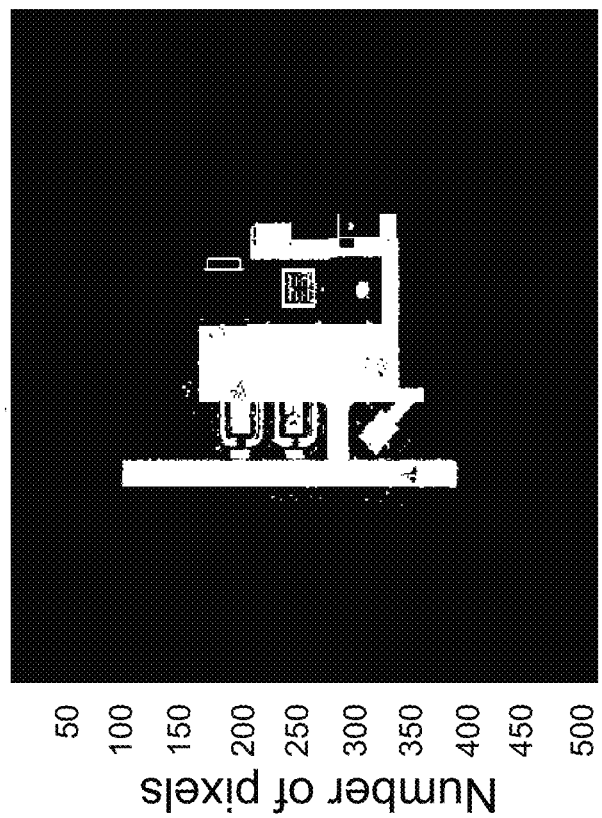
FIG. 8B is an illustration of anomaly points distributed as a line in the background region in the NVIR1m data cube.

The second hyperspectral data cube is a simulated NVIR hyperspectral data cube (NVIR1m). The data cube has a size of 512×512×105 and a ground sampling distance (GSD) of one meter. FIGS. 8A and 8B depict a sample 2D image from band 82 and ten anomaly points distributed as a line in the background region. The anomaly points are single pixel points, and the points shown in FIG. 8B are enlarged for viewing the points. The ten anomaly points are added into the data for evaluating the techniques according to embodiments of this disclosure. Using the present invention, all anomaly points can be detected. The measure used to evaluate the invention described herein is the false detection rate. The goal is to detect all of the anomaly points without false detection.

In the PSO search for the optimal virtual bandwidths, Pfa90 was used as the fitness cost. Pfa90 is defined as:

$$Pfa90 = \text{prob}(\text{falseprob}(\text{target\_detection}) = 0.9)$$

The PSO search parameters are given as follows:
Number of Particles=20
Iteration Number=50
Inertial Weight w=1.0
Inertial Damping Weight $w_{damp} = 0.99$
Personal Learning Coefficient $c_1 = 1.5$
Global Learning Coefficient $c_2 = 2.0$ The PSO optimization procedure was run for a set of virtual bands from 5 bands to 20 bands. To see the advantages of the PSO optimization, the anomaly detections using the PSO optimization were compared to the anomaly detections using uniform virtual bands.

Figure 9:
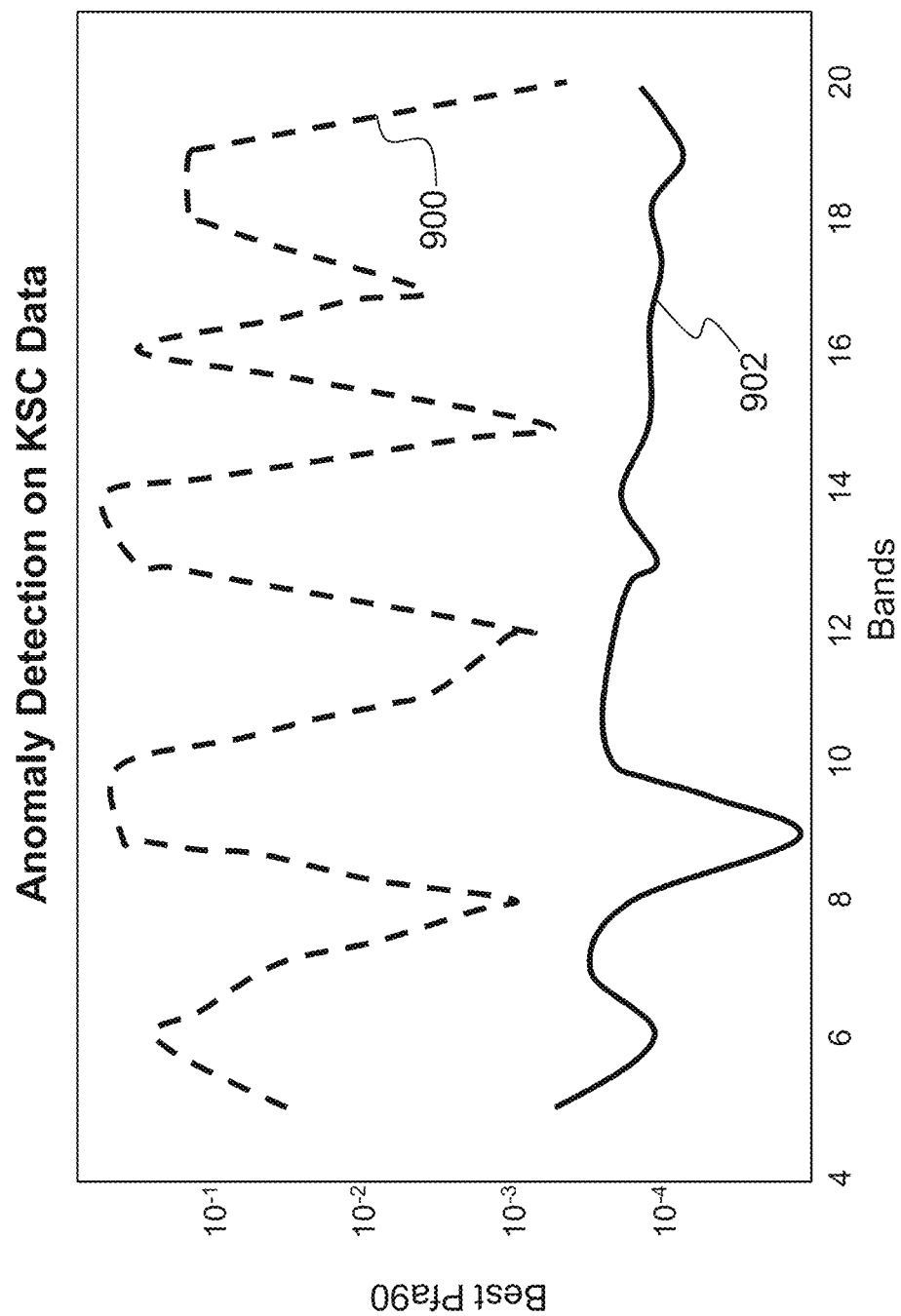
FIG. 9 is an illustration of anomaly detection results with different number of virtual bands for KSC data according to some embodiments of the present disclosure.

FIG. 9 depicts the anomaly detection results with different virtual bands on the KCS data. The dashed line 900 is the anomaly detection results (Pfa90) with uniform virtual bands created from the 176 original data bands, while the solid line 902 is the detection results obtained by the PSO optimization technique. The PSO optimization (solid line 902) technique provides much better Pfa90 than the ones obtained by uniform virtual bands (dashed line 900).

Figure 10B:
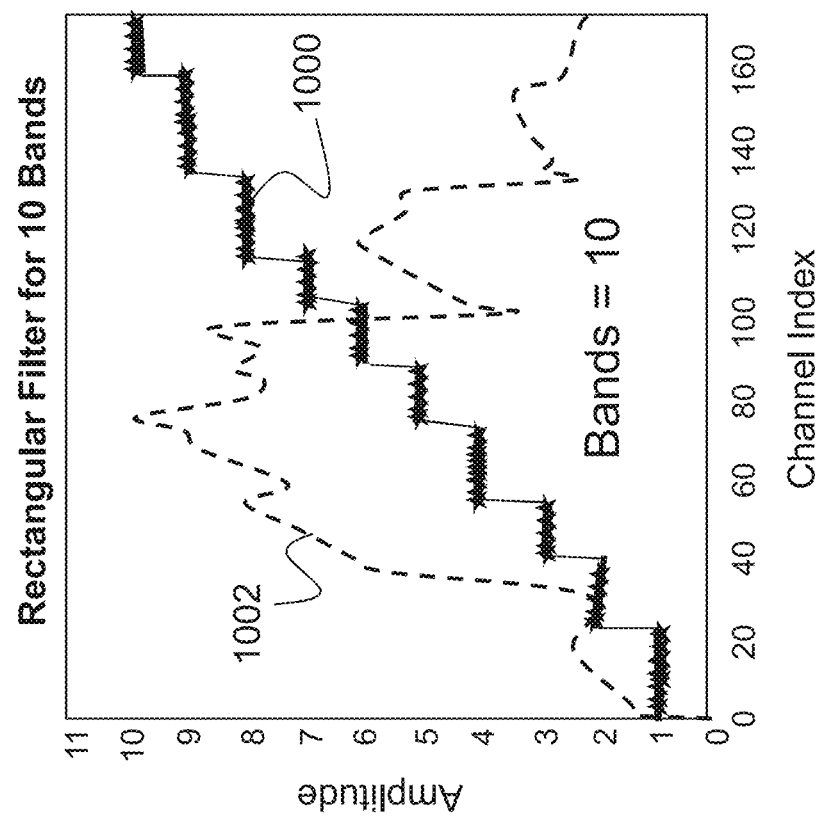
FIG. 10B is an illustration of virtual bandwidth distribution for KSC data according to some embodiments of the present disclosure.
Figure 10A:
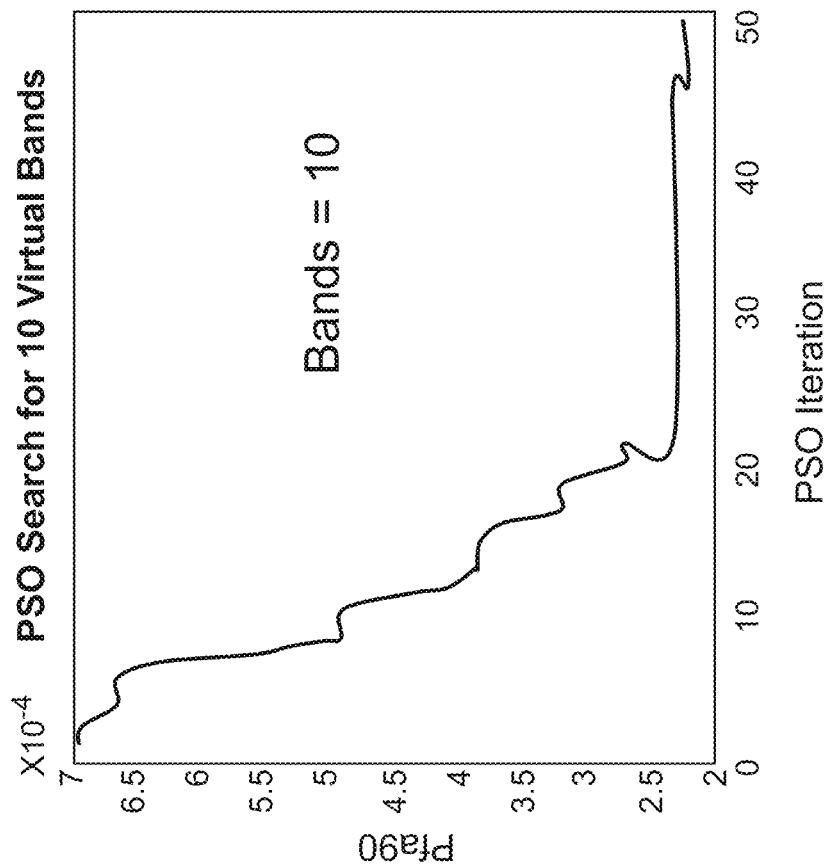
FIG. 10A is an illustration of samples of PSO search for KSC data according to some embodiments of the present disclosure.

FIGS. 10A and 10B show an example of PSO search result and the distribution of the optimal virtual bandwidth. Specifically, FIG. 10A shows that for ten virtual bands, the Pfa90 decreases as the PSO iteration number increases, which proves the PSO optimization is effective to find the optimal virtual bandwidths for achieving the best anomaly detection. FIG. 10B shows the distribution of ten virtual bandwidths (represented by line 1000) over the original 176 data bands and it shows the optimal virtual bandwidths (star line) are not uniformly distributed over the wavelengths (original 176 data bands). The dashed line 1002 is the mean spectra of the KSC data set distributed over the 176 data bands.

Figure 11:
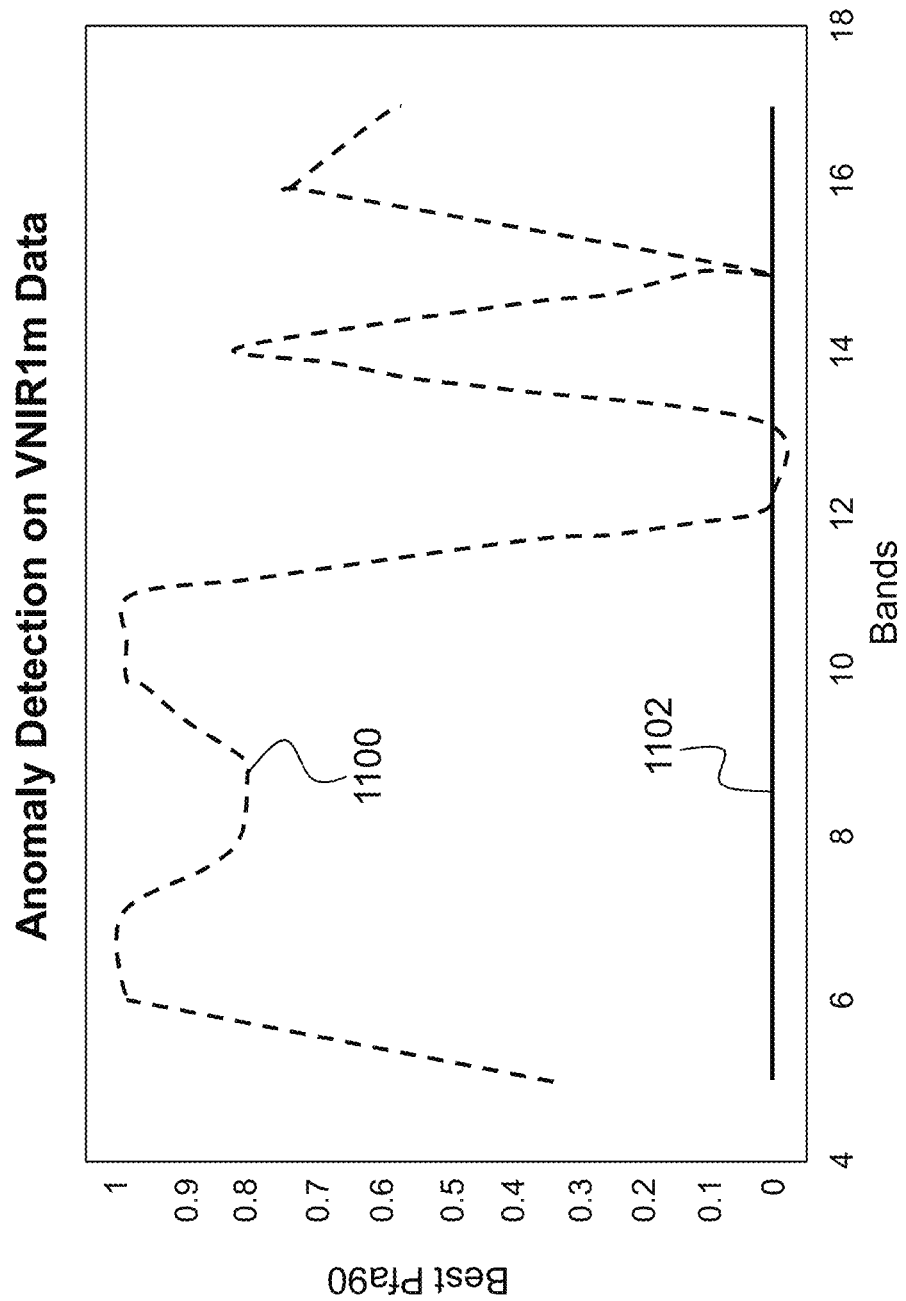
FIG. 11 is an illustration of anomaly detection results with different number of virtual bands for NVIR1m data according to some embodiments of the present disclosure.

FIG. 11 presents the anomaly detection results on the NVIR1m data. The dashed line 1100 is the anomaly detection results (Pfa90) with uniform virtual bandwidths. The solid line 1102 is the detection results obtained by the PSO optimization technique described herein. FIG. 11 shows that the PSO optimization technique (solid line 1102) is able to produce no false detections for all testing numbers of virtual bands. When the number of virtual bands is large, the uniform virtual bandwidths (dashed line 1100) may sometimes be able to produce the optimal detection results.

Figures 12A, 12B:
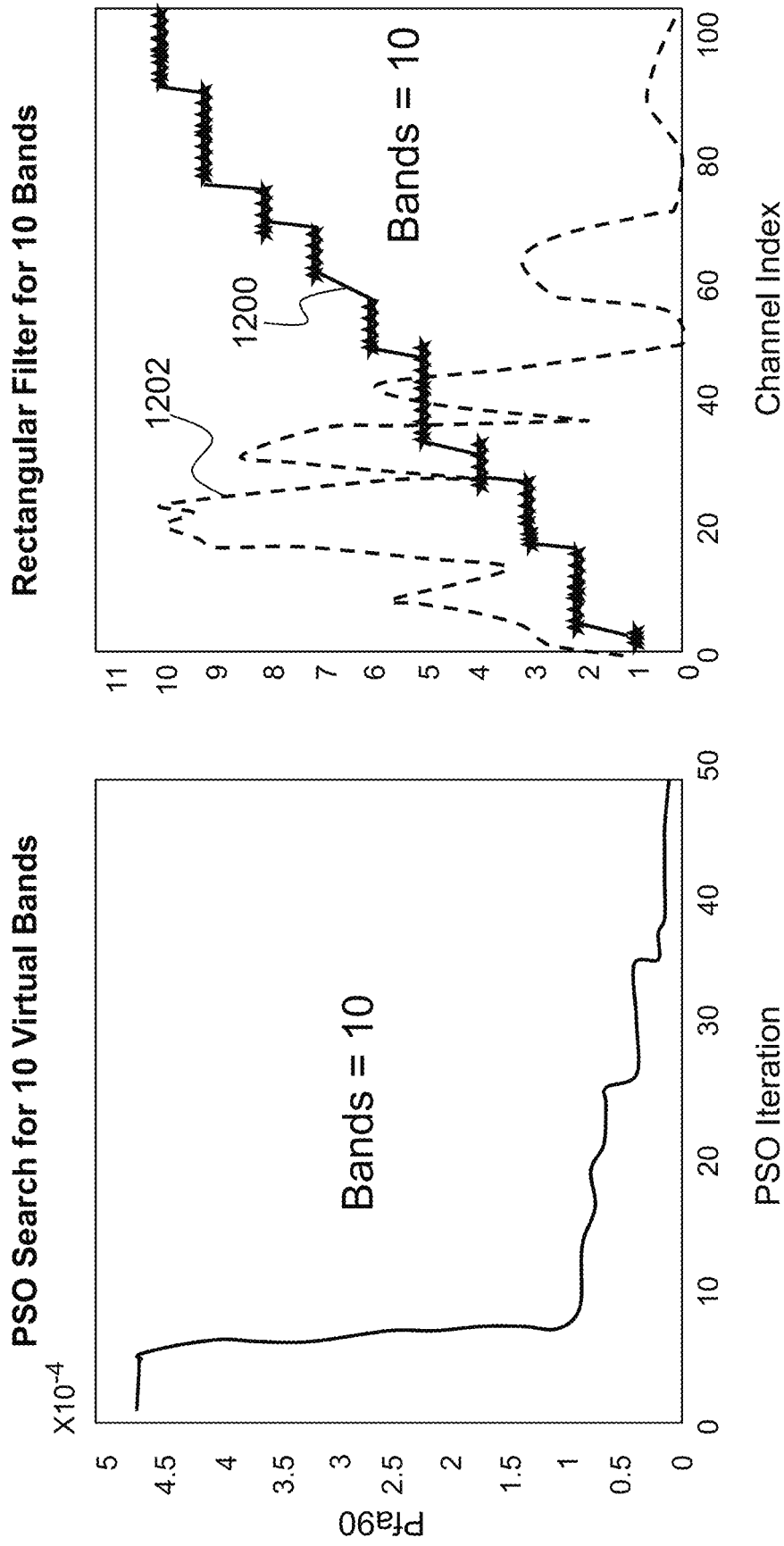
FIG. 12A is an illustration of samples of PSO search for NVIR1m data according to some embodiments of the present disclosure.
FIG. 12B is an illustration of virtual bandwidth distribution for NVIR1m data according to some embodiments of the present disclosure.

FIGS. 12A and 12B present an example of the PSO optimization search and the optimal virtual bandwidth distribution for NVIR1m data. FIG. 12A shows that the PSO optimization technique is able to reduce the false detections as the PSO iteration number increases. FIG. 12B shows the distribution of the optimal virtual bandwidths (represented by line 1200) for the NVIR1m data, which is not a uniform distribution either. The dashed line 1202 in the plot is the mean spectra of the NVIR1m data. The distribution of the optimal virtual bandwidths over the wavelengths may depend on both the mean spectral of the data and the spectral of the anomaly points. Before detecting the anomaly points, it is difficult to find the optimal virtual bandwidths; the PSO optimization technique according to embodiments of the present disclosure provides a tool to solve this problem.

The experimental tests have shown that the anomaly detection with the optimal virtual bands obtained by the PSO optimization technique can deliver the best detection results. The PSO optimization technique is able to find the optimal virtual bandwidths for a given number of bands and it is also able to find the best number of virtual bands by searching in a range of potential numbers of virtual bands. The virtual band approach described herein greatly reduces the amount of data to process and is able to achieve the best anomaly detection results. The technique can provide useful information to guide the hardware design of hyperspectral sensor systems since it can find the best number of bands and the optimal bandwidth distribution over a given wavelength range for many anomaly detection applications.

The invention described herein will enhance hyperspectral data analysis for surveillance and target detection in many applications. For example, after a target is detected, the target may be classified and the movement of the target tracked. In a ship detection example, the ship's spectra may be used to classify the ship and track the movement of the ship from a satellite. Without the detection, the ship cannot be classified or tracked. As can be appreciated by one skilled in the art, tracking of other vehicles (or any other mobile platform), is possible, including ground vehicles.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for anomaly detection from hyperspectral data, the system comprising:
one or more processors and a non-transitory computer-readable medium having executable instructions encoded thereon such that when executed, the one or more processors perform operations of:
receiving, from a hyperspectral sensor, a plurality of input three-dimensional (3D) hyperspectral data cubes, each 3D hyperspectral data cube comprising a plurality of original input data bands for every pixel;
using an optimization technique, determining an optimized number of virtual bands to use for combining the plurality of 3D hyperspectral data cubes to achieve optimized anomaly detection performance, wherein the optimized number of virtual bands is less than the original input data bands, resulting in reduced hyperspectral data;
generating a set of combined hyperspectral data by combining the plurality of 3D hyperspectral data cubes into the optimized number of virtual bands with a bandwidth for each virtual band;
detecting anomalies in the set of combined hyperspectral data using an anomaly detection technique;
detecting single-pixel or subpixel targets of interest in the combined hyperspectral data based on the detected anomalies;
where in determining the optimized number of virtual bands, the one or more processors perform operations of:
for a set of virtual bands, initially selecting bandwidths of the set of virtual bands at random;
computing encoded values of the selected bandwidths, resulting in encoded virtual bandwidths;
generating a rectangular filter bank using the encoded virtual bandwidths; and
transforming the plurality of input 3D hyperspectral data cubes into virtual band data cubes using the rectangular filter bank.

2. The system as set forth in claim 1, wherein the one or more processors further perform operations of:
optimizing bandwidths for each virtual band in the set of bands using the optimization technique, thereby generating a plurality of optimized virtual bandwidths;

constructing a set of rectangular filters using the plurality of optimized virtual bandwidths;
filtering the plurality of input 3D hyperspectral data cubes by the set of rectangular filters;
generating a set of filtered input data; and
detecting anomaly points in the set of filtered input data using the anomaly detection technique.

3. The system as set forth in claim 2, wherein the optimization technique is particle swarm optimization (PSO), and wherein the encoded virtual bandwidths correspond to positions of particles, and wherein a false detection probability for a given positive detection probability is used as a fitness cost function to be minimized by PSO.

4. The system as set forth in claim 3, wherein the one or more processors further perform operations of:
randomly initializing the positions of the particles;
using the initial positions of the particles, computing a fitness cost for each particle using the anomaly detection technique;
for each iteration:
  computing a velocity for each particle;
  updating each particle's position based on the computed velocity;
  using the updated particle positions, computing a new fitness cost for each particle using the anomaly detection technique;
using the new fitness cost, updating a local position for each particle;
updating a global position for each particle; and
updating an inertial weight;
wherein following a pre-defined number of iterations, the global best positions converge to a global optimized position, the global optimized position corresponding to the plurality of optimized virtual bandwidths.

5. A computer program product for anomaly detection from hyperspectral data, the computer program product comprising:
a non-transitory computer-readable medium having executable instructions encoded thereon, such that upon execution of the instructions by one or more processors, the one or more processors perform operations of:
  receiving, from a hyperspectral sensor, a plurality of input three-dimensional (3D) hyperspectral data cubes, each 3D hyperspectral data cube comprising a plurality of original input data bands for every pixel;
  using an optimization technique, determining an optimized number of virtual bands to use for combining the plurality of 3D hyperspectral data cubes to achieve optimized anomaly detection performance, wherein the optimized number of virtual bands is less than the original input data bands, resulting in reduced hyperspectral data;
  generating a set of combined hyperspectral data by combining the plurality of 3D hyperspectral data cubes into the optimized number of virtual bands with a bandwidth for each virtual band;
  detecting anomalies in the set of combined hyperspectral data using an anomaly detection technique; and
  detecting single-pixel or subpixel targets of interest in the combined hyperspectral data based on the detected anomalies;
  where in determining the optimized number of virtual bands, the one or more processors perform operations of:
    for a set of virtual bands, initially selecting bandwidths of the set of virtual bands at random;
    computing encoded values of the selected bandwidths, resulting in encoded virtual bandwidths;
    generating a rectangular filter bank using the encoded virtual bandwidths; and
    transforming the plurality of input 3D hyperspectral data cubes into virtual band data cubes using the rectangular filter bank.

6. The computer program product as set forth in claim 5, wherein the one or more processors further perform operations of:
optimizing bandwidths for each virtual band in the set of virtual bands using the optimization technique, thereby generating a plurality of optimized virtual bandwidths;
constructing a set of rectangular filters using the plurality of optimized virtual bandwidths;
filtering the plurality of input 3D hyperspectral data cubes by the set of rectangular filters;
generating a set of filtered input data; and
detecting anomaly points in the set of filtered input data using the anomaly detection technique.

7. The computer program product as set forth in claim 6, wherein the optimization technique is particle swarm optimization (PSO), and wherein the encoded virtual bandwidths correspond to positions of particles, and wherein a false detection probability for a given positive detection probability is used as a fitness cost function to be minimized by PSO.

8. The computer program product as set forth in claim 7, wherein the one or more processors further perform operations of:
randomly initializing the positions of the particles;
using the initial positions of the particles, computing a fitness cost for each particle using the anomaly detection technique;
for each iteration:
  computing a velocity for each particle;
  updating each particle's position based on the computed velocity;
  using the updated particle positions, computing a new fitness cost for each particle using the anomaly detection technique;
using the new fitness cost, updating a local position for each particle;
updating a global position for each particle; and
updating an inertial weight;
wherein following a pre-defined number of iterations, the global best positions converge to a global optimized position, the global optimized position corresponding to the plurality of optimized virtual bandwidths.

9. A computer implemented method for anomaly detection from hyperspectral data, the method comprising an act of:
causing one or more processors to execute instructions encoded on a non-transitory computer-readable medium, such that upon execution, the one or more processors perform operations of:
  receiving, from a hyperspectral sensor, a plurality of input three-dimensional (3D) hyperspectral data cubes, each 3D hyperspectral data cube comprising a plurality of original input data bands for every pixel;
  using an optimization technique, determining an optimized number of virtual bands to use for combining the plurality of 3D hyperspectral data cubes to achieve optimized anomaly detection performance, wherein the optimized number of virtual bands is less than the original input data bands, resulting in reduced hyperspectral data;

generating a set of combined hyperspectral data by combining the plurality of 3D hyperspectral data cubes into the optimized number of virtual bands with a bandwidth for each virtual band;

detecting anomalies in the set of combined hyperspectral data using an anomaly detection technique;

detecting single-pixel or subpixel targets of interest in the combined hyperspectral data based on the detected anomalies;

where in determining the optimized number of virtual bands, the one or more processors perform operations of:

for a set of virtual bands, initially selecting bandwidths of the set of virtual bands at random;
  computing encoded values of the selected bandwidths, resulting in encoded virtual bandwidths;
  generating a rectangular filter bank using the encoded virtual bandwidths; and
  transforming the plurality of input 3D hyperspectral data cubes into virtual band data cubes using the rectangular filter bank.

10. The method as set forth in claim 9, wherein the one or more processors further perform operations of:
  optimizing bandwidths for each virtual band in the set of virtual bands using the optimization technique, thereby generating a plurality of optimized virtual bandwidths;
  constructing a set of rectangular filters using the plurality of optimized virtual bandwidths;
  filtering the plurality of input 3D hyperspectral data cubes by the set of rectangular filters;
  generating a set of filtered input data; and
  detecting anomaly points in the set of filtered input data using the anomaly detection technique.

11. The method as set forth in claim 10, wherein the optimization technique is particle swarm optimization (PSO), and wherein the encoded virtual bandwidths correspond to positions of particles, and wherein a false detection probability for a given positive detection probability is used as a fitness cost function to be minimized by PSO.

12. The method as set forth in claim 11, wherein the one or more processors further perform operations of:
  randomly initializing the positions of the particles;
  using the initial positions of the particles, computing a fitness cost for each particle using the anomaly detection technique;
  for each iteration:
    computing a velocity for each particle;
    updating each particle's position based on the computed velocity;
    using the updated particle positions, computing a new fitness cost for each particle using the anomaly detection technique;
  using the new fitness cost, updating a local position for each particle;
  updating a global position for each particle; and
  updating an inertial weight;
  wherein following a pre-defined number of iterations, the global best positions converge to a global optimized position, the global optimized position corresponding to the plurality of optimized virtual bandwidths.

* * * * *